(12) United States Patent
Jalilian et al.

(10) Patent No.: US 12,078,518 B2
(45) Date of Patent: Sep. 3, 2024

(54) METHOD OF ESTIMATING FLOWRATE IN A PIPELINE

(71) Applicant: Hifi Engineering Inc., Calgary (CA)

(72) Inventors: Seyed Ehsan Jalilian, Calgary (CA); Dongliang Huang, Calgary (CA); Henry Leung, Calgary (CA); King Fai Ma, Calgary (CA)

(73) Assignee: Hifi Engineering Inc., Alberta (CA)

( * ) Notice: Subject to any disclaimer, the term of this patent is extended or adjusted under 35 U.S.C. 154(b) by 1172 days.

(21) Appl. No.: 16/310,375

(22) PCT Filed: Jun. 14, 2017

(86) PCT No.: PCT/CA2017/050732
§ 371 (c)(1),
(2) Date: Dec. 14, 2018

(87) PCT Pub. No.: WO2017/214729
PCT Pub. Date: Dec. 21, 2017

(65) Prior Publication Data
US 2019/0331513 A1     Oct. 31, 2019

Related U.S. Application Data

(60) Provisional application No. 62/351,182, filed on Jun. 16, 2016.

(51) Int. Cl.
*G01F 1/66* (2022.01)
*G01M 3/28* (2006.01)
(Continued)

(52) U.S. Cl.
CPC .............. *G01F 1/666* (2013.01); *G01F 1/662* (2013.01); *G01M 3/2807* (2013.01); *G06N 3/08* (2013.01); *G06N 20/00* (2019.01); *G06N 3/0455* (2023.01)

(58) Field of Classification Search
CPC ...... G01F 1/666; G01F 1/662; G01M 3/2807; G06N 3/08; G06N 20/00; G06N 3/0455
See application file for complete search history.

(56) References Cited

U.S. PATENT DOCUMENTS

| | | | |
|---|---|---|---|
| 5,741,980 A * | 4/1998 | Hill | G01N 29/42 73/861.04 |
| 2003/0051558 A1* | 3/2003 | Melnikov | G01F 1/663 73/861.27 |

(Continued)

FOREIGN PATENT DOCUMENTS

WO     WO2013/102252 A1     7/2013

OTHER PUBLICATIONS

Pascal Vincent et al. 2008."Extracting and composing robust features with denoising autoencoders", In Proceedings of the 25th international conference on Machine learning (ICML '08). Association for Computing Machinery, New York, NY, USA, 1096-110 (Year: 2008).*

(Continued)

*Primary Examiner* — John C Kuan
(74) *Attorney, Agent, or Firm* — Klarquist Sparkman, LLP

(57) ABSTRACT

There is provided a method of estimating flowrate in a pipeline based on acoustic behaviour of the pipe. First acoustic data is measured from the pipeline. A flowrate of the fluid in the pipeline is then estimated. The estimation is based on the first acoustic data and based on a correlation established between second acoustic data and corresponding flowrate data from an experimental pipeline. The correlation is established by a machine learning process (which may include the use of an artificial neural network, such as an (Continued)

autoencoder). The second acoustic data and corresponding flowrate data are used as inputs to the machine learning process.

16 Claims, 5 Drawing Sheets

(51) Int. Cl.
  *G06N 3/0455* (2023.01)
  *G06N 3/08* (2023.01)
  *G06N 20/00* (2019.01)

(56) References Cited

U.S. PATENT DOCUMENTS

| | | | |
|---|---|---|---|
| 2009/0022181 A1* | 1/2009 | Atkins | H01S 5/146 372/6 |
| 2010/0313958 A1* | 12/2010 | Patel | E03B 7/071 137/552 |
| 2012/0046866 A1 | 2/2012 | Meyer et al. | |
| 2014/0366612 A1* | 12/2014 | Horne | G01F 1/66 73/40.5 A |
| 2015/0144333 A1 | 5/2015 | Lee et al. | |
| 2015/0315773 A1* | 11/2015 | Mullaney | B29C 64/386 285/125.1 |
| 2015/0330863 A1* | 11/2015 | Dotan | F17D 5/06 702/51 |
| 2016/0281494 A1* | 9/2016 | Shirdel | E21B 47/06 |
| 2016/0356665 A1* | 12/2016 | Felemban | G01M 3/2807 |
| 2018/0010443 A1* | 1/2018 | Lu | E21B 49/08 |
| 2019/0120044 A1* | 4/2019 | Langnes | G01V 1/226 |

OTHER PUBLICATIONS

International Search Report and Written Opinion of the International Searching Authority, mailed Aug. 17, 2017, for corresponding International Application No. PCT/CA2017/050732, 8 pages.
International Preliminary Report on Patentability of the International Searching Authority, mailed Dec. 18, 2018, for corresponding International Application No. PCT/CA2017/050732, 6 pages.
Baldi et al., Autoencoders, Unsupervised Learning, and Deep Architectures, JMLR: Workshop and Conference Proceedings, 2012, pp. 37-50.
Barradas et al., "Leaks Detection in a Pipeline Using Artificial Neural Networks," Tecnológico de Monterrey, Campus Monterrey, 2009, pp. 637-644.
Belsito et al., "Leak Detection in Liquefied Gas Pipelines by Artificial Neural Networks," AIChE Journal, vol. 44, No. 12, Dec. 1998, pp. 2675-2688.
Boyd et al., "The Uses of Passive Measurement of Acoustic Emissions from Chemical Engineering Processes," *Chemical Engineering Sciences*, vol. 56, 2001, pp. 1749-1767.
Chen et al., "Deep Learning-Based Classification of Hyperspectral Data," *IEEE Journal of Selected Topics in a Applied Earth Observations and Remote Sensing*, vol. 7, No. 6, Jun. 2014, pp. 2094-2107.
Glorot et al., "Understanding the Difficulty of Training Deep Feedforward Neural Networks," DIRO, Université de Montréal, Montréal, Québec, Canada, 2010, pp. 249-256.
Hinton et al., "Reducing the Dimensionality of Data with Neural Networks," *Science*, vol. 313, Jul. 28, 2006, pp. 504-507.
Hou et al., "Acoustic Monitoring of Pipeline Flows: Particular Slurries," *Powder Technology*, vol. 106, 1999, pp. 30-36.
Johannessen et al., "Distributed Acoustic Sensing—a New Way of Listening to Your Well/Reservoir," SPE 149602, SPE Intelligent Energy International, Utrecht, The Netherlands, Mar. 27-29, 2012, 9 pages.
Lahiri et al., "Prediction of Pressure Drop of Slurry Flow in Pipeline by Hybrid Support Vector Regression and Genetic Algorithm Model," *Chinese Journal of Chemical Engineering*, vol. 16, No. 6, 2008, pp. 841-848.
Liu, Chapter 10, "Instrumentation and Pigging," in Pipeline Engineering, 2003, pp. 289-317.
Ma et al., "Deep Learning on Acoustic Data to Monitor Flowrate in Pipelines," Dept. of Electrical and Computer Engineering, University of Calgary, May 2017, 6 pages.
Raiko et al., "Deep Learning Made Easier by Linear Transformations in Perceptrons," 2012, pp. 924-932.
Shaban et al., "Measurement of Gas and Liquid Flow Rates in Two-Phase Pipe Flows by the Application of Machine Learning Techniques to Differential Pressure Signals," Dept. of Mechanical Engineering, University of Ottawa, Dec. 2014, 32 pages.
Sutskever et al., "On the Importance of Initialization and Momentum in Deep Learning," JMLR: W&CP, vol. 28, 2013, 9 pages.
Uria et al., "A Deep Neural Network for Acoustic-Articulatory Speech Inversion," Dec. 2011, 9 pages.
Vincent et al., "Stacked Denoising Autoencoders: Learning Useful Representations in a Deep Network with a Local Denoising Criterion," *Journal of Machine Learning Research*, vol. 11, Dec. 2010, pp. 3371-3408.
Zhang, Dr. Jun, "Designing a Cost Effective and Reliable Pipeline Leak Detection System," Pipeline Reliability Conference, Houston, Texas, Nov. 19-22, 1996, 11 pages.

\* cited by examiner

METHOD OF ESTIMATING FLOWRATE IN A PIPELINE

FIELD OF THE DISCLOSURE

The present disclosure relates to a method of estimating flowrate in a pipeline, and in particular relates to a method of estimating flowrate of a fluid moving in a pipeline, such as a pipeline used in the oil and gas industry.

Background to the Disclosure

Pipelines are typically used to economically and quickly transport large quantities of fluids over long distances. Since the fluid transported by pipelines is often sold as a commodity, it can be important to know the amount of fluid moving through a pipeline over a given period of time. In particular, accurately determining the rate of flow (or flowrate) of a fluid at a given point in the pipeline can help maximize production and profitability. Furthermore, in some applications changes in flowrate may result in degradation of product quality and may pose safety concerns. Without monitoring flowrate, accidents such as leaks can occur or got unnoticed.

Traditionally, flowrate is measured using flow meters that determine flowrate based on first principles. Most rely on converting a measurement variable (pressure, displacement) into flowrate using fluid equations. The choice of these flow meters generally depends on system properties, operating conditions, installation location, and the type of fluid. One type of flow meter is a mechanical flow meter such as a turbine flow meter which measures the displacement of a fluid over time. However, the flow operating range is limited, and such flow meters often require maintenance due to moving parts. Another type of flow meter is an orifice plate meter that measures the pressure differential, but which can obstruct flow.

Fiber-optic acoustic sensing is being increasingly used for pipeline monitoring. Such sensing equipment can be deployed alongside a pipe, without interfering with the operation of the pipe. Fiber-optic acoustic sensing is based on the principle that fluids interacting with a pipeline will generate vibration signals. The amplitude of the signals depends on the properties of the fluid, including the flowrate, pressure and viscosity. In distributed fiber optic acoustic sensing (DAS) applications, fiber-optic cable can be used to provide acoustic profiles at all points along the length of the fiber. This data can potentially be used for leak detection, seismic profiling, flow modeling, and gas identification. Several papers discuss pipeline modelling by using observed empirical data (temperature, pressure) to describe pipeline operation (mixture content, flowrate) and classify abnormal situations, such as leaks; see J. Zhang, "Designing a cost-effective and reliable pipeline leak-detection system," *Pipes Pipelines Int.*, pp. 1-11, 1997, and S. Belsito, P. Lombardi, P. Andreussi, and S. Banerjee, "Leak detection in liquefied gas pipelines by artificial neural networks," *AIChE J.*, vol. 44, no. 12, pp. 2675-2688, 1998.

J. W. R. Boyd and J. Varley, "The uses of passive measurement of acoustic emissions from chemical engineering processes," *Chem. Eng. Sci.*, vol. 56, no. 5, pp. 1749-1767, 2001, provides a literature review of passive acoustic applications. They summarize that low frequencies can be used for pipe monitoring, and frequencies up to 200 Hz are flow-representative. R. Hou, A. Hunt, and R. A. Williams, "Acoustic monitoring of pipeline flows: Particulate slurries," *Powder Technol.*, vol. 106, no. 1-2, pp. 30-36, 1999, suggests that a spectral analysis on the acoustic data shows variations of frequency amplitudes are likely dependent on flowrates.

Despite these advances in the field, there remains a need in the art to provide new and improved ways of measuring flowrate in a pipeline.

SUMMARY OF THE DISCLOSURE

The present disclosure provides a method of estimating flowrate in a pipeline based on acoustic behaviour of the pipe. Using artificial neural networks, the flowrate may be determined from observed acoustic data. Advantageously, by using a statistical method to estimate flowrate, the fluid properties are not required to be known. The data may be preprocessed and transformed to the frequency domain for feature extraction. Deep learning and artificial neural network models with autoencoders may be used to derive spectral features that correlate with the flowrate.

In a first aspect of the disclosure, there is provided a method of estimating flowrate of a fluid in a pipeline. The method comprises measuring first acoustic data from the pipeline; and estimating a flowrate of the fluid in the pipeline, based on the first acoustic data and based on a correlation established between second acoustic data and corresponding flowrate data from an experimental pipeline, the correlation being established by a machine learning process using the second acoustic data and corresponding flowrate data as inputs to the machine learning process.

The second acoustic data may be processed such that at least some of the second acoustic data is transformed from a time domain into a frequency domain. The processing may comprise applying a Fast Fourier Transform (FFT) to the at least some of the second acoustic data.

The second acoustic data may comprise second acoustic data as a function of a position along the experimental pipeline.

The machine learning process may comprise an artificial neural network. The artificial neural network may comprise an autoencoder.

The pipeline and the experimental pipeline may be the same pipeline.

The experimental pipeline may comprise a virtual pipeline modelling the pipeline.

Estimating flowrate of the fluid in the pipeline may comprise estimating flowrate of the fluid at a first point in the pipeline. The corresponding flowrate data may comprise flowrate data at a second point in the experimental pipeline.

The method may further comprise identifying a leak in the pipeline by comparing an estimation of flowrate at a first point in the pipeline to an estimation of flowrate at a second point in the pipeline. The estimations being carried out according any of the above-described methods.

In a further aspect of the disclosure, there is provided a non-transitory computer-readable medium having instructions stored thereon. The instructions are configured when read by a machine to cause the steps of any of the above-described methods to be carried out.

In a further aspect of the disclosure, there is provided a method of estimating flowrate of a fluid in a pipeline. The method comprises obtaining an experimental dataset representative of first acoustic data and corresponding flowrate data from an experimental pipeline; using a machine learning process to establish a correlation between the first acoustic data and the corresponding flowrate data; measuring second acoustic data from the pipeline; and estimating a flowrate of the fluid in the pipeline, based on the second acoustic data and based on the established correlation.

Obtaining the experimental dataset may comprise: measuring the first acoustic data from the pipeline; and measuring the corresponding flowrate data of the fluid in the pipeline.

The pipeline and experimental pipeline may be the same pipeline.

The experimental dataset may be processed such that at least some of the first acoustic data is transformed from a time domain into a frequency domain. The processing may comprise applying a Fast Fourier Transform (FFT) to the at least some of the first acoustic data.

The first acoustic data may comprise first acoustic data as a function of a position along the pipeline.

Using the machine learning process may comprise using an artificial neural network. The experimental dataset may be used as an input to the artificial neural network. The artificial neural network may comprise an autoencoder.

The experimental pipeline may comprise a virtual pipeline modelling the pipeline.

Estimating flowrate of the fluid in the pipeline may comprise estimating flowrate of the fluid at a first point in the pipeline. The corresponding flowrate data may comprise flowrate data at a second point in the experimental pipeline.

The method may further comprise identifying a leak in the pipeline by comparing an estimation of flowrate at a first point in the pipeline to an estimation of flowrate at a second point in the pipeline. The estimations may be carried out according to any of the above-described methods.

In a further aspect of the disclosure, there is provided a system for estimating flowrate of a fluid in a pipeline. The system comprises: an optical fiber positioned in acoustic proximity to the pipeline and configured to detect sounds from the pipeline; an optical interrogator optically coupled to the optical fiber and configured to convert the detected noise into first acoustic data; and one or more processors. The one or more processors are communicative with the optical interrogator and configured to: estimate a flowrate of the fluid in the pipeline, based on the first acoustic data and based on a correlation established between second acoustic data and corresponding flowrate data from an experimental pipeline, the correlation being established by a machine learning process using the second acoustic data and corresponding flowrate data as inputs to the machine learning process.

The optical fiber may comprise a pair of fiber Bragg gratings tuned to substantially identical center wavelengths.

The optical interrogator may be configured to optically interrogate the fiber Bragg gratings and to output the first acoustic data representing the detected noise.

The second acoustic data may be processed such that at least some of the second acoustic data is transformed from a time domain into a frequency domain. The processing may comprise applying a Fast Fourier Transform (FFT) to the at least some of the second acoustic data.

The second acoustic data may comprise second acoustic data as a function of a position along the experimental pipeline.

The machine learning process may comprise an artificial neural network. The artificial neural network may comprise an autoencoder.

The pipeline and the experimental pipeline may be the same pipeline.

The experimental pipeline may comprise a virtual pipeline modelling the pipeline.

The one or more processors may be further configured to estimate a flowrate of the fluid at a first point in the pipeline. The corresponding flowrate data may comprise flowrate data at a second point in the experimental pipeline.

The one or more processors may be further configured to identify a leak in the pipeline by comparing an estimation of flowrate at a first point in the pipeline to an estimation of flowrate at a second point in the pipeline.

BRIEF DESCRIPTION OF THE DRAWINGS

Specific embodiments of the disclosure will now be described in conjunction with the accompanying drawings of which.

DETAILED DESCRIPTION OF SPECIFIC EMBODIMENTS

The present disclosure seeks to provide an improved method and system for estimating flowrate in a pipeline. While various embodiments of the disclosure are described below, the disclosure is not limited to these embodiments, and variations of these embodiments may well fall within the scope of the disclosure which is to be limited only by the appended claims.

Autoencoders

An autoencoder is a type of feedforward network that reconstructs the input as the output. An autoencoder generally consists of an encoding layer and a decoding layer. The encoding layer ("encoder") maps input x to representation y. The decoding layer ("decoder") returns an estimate of x from y. Equations 1 and 2 describe the encoder and decoder mapping respectively.

$$y = f(Wx+b) \quad (1)$$

$$\hat{x} = f(W_y y + b_y) \quad (2)$$

W is a $d_2 \times d_1$ matrix that maps input vector x of dimension $d_1$ into the encoded dimension $d_2$, with bias term b (dimension $d_2$). For nonlinear representations, the activation function $f$ can be a sigmoid. Unsupervised training to get optimal weight parameters may be achieved by minimizing the reconstruction error between input and output.

The encoder may learn important features that describe the input. This is particularly useful when dealing with large numbers of correlated features. A nonlinear or multiple hidden layers of autoencoders may allow complex compression of data similar to nonlinear-PCA. Forcing sparsity, bottleneck on representation, or allowing more neurons than inputs has also been shown to extract useful features. If using noisy inputs, autoencoders can learn key features that are robust to noise and that exhibit better generalization for supervised learning. In deep learning, encoder outputs are used as inputs to the next layer. For regression problems, a regression layer can be used to generate a deep network. It has been shown that local unsupervised pre-training of each autoencoder layer with backpropagation fine-tuning can give better generalization performance of deep networks.

Algorithm Development

Figure 1A:
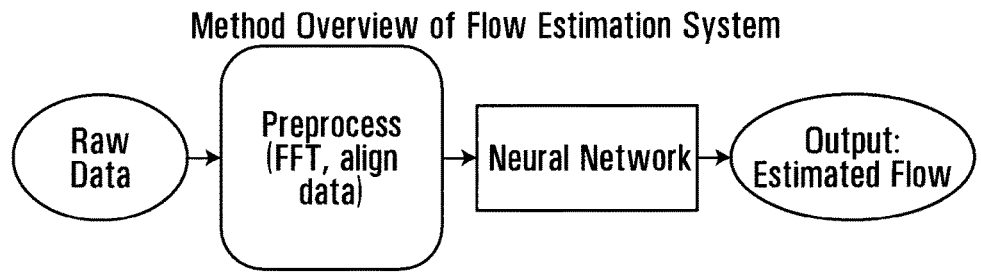
FIG. 1A is a schematic representation of a method of estimating flowrate in a pipeline, according to an embodiment of the disclosure.
Figure 1B:
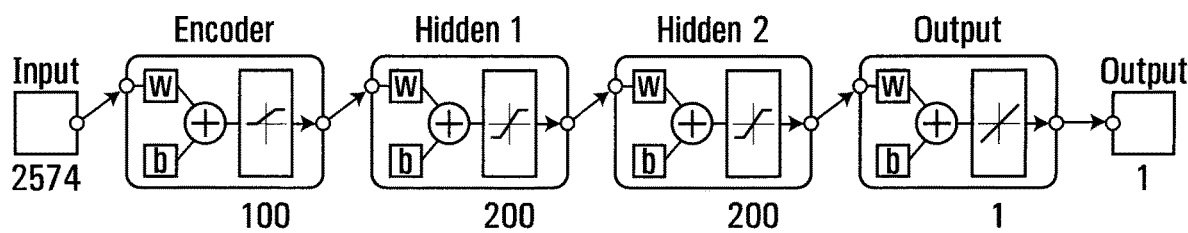
FIG. 1B is a schematic representation of an autoencoder neural network.

FIG. 1A is an overview of a method of estimating flowrate in a pipeline, according to an embodiment of the disclosure. A feedforward neural network (shown in FIG. 1B) is used as the model to train for the fluid flow. The network contains an input layer, encoding hidden layers, several hidden layers with non-linear activation functions, and an output regression layer. Autoencoders with a sigmoid hidden unit are used to generate compressed features. Following the method of a J. Holden, et al., "Reducing the Dimensionality of Data with Neural Networks," Science, vol. 313, no. July, pp. 504-507, 2006, the inputs are trained unsupervised, one layer at a time. The output of the autoencoder is used as the input to a multi-layer perceptron (MLP) and fine-tuned using target flowrates via scaled conjugate gradient (SCG) backpropagation. Autoencoder pre-training helps minimize large noise spikes when estimating flowrate. For this regression problem, the activation functions for the MLP are tan-sigmoid in the hidden layers and a linear activation in the output regression layer (FIG. 1B).

The network's parameters were tweaked to optimize the mean squared error (MSE) loss function. A five-fold cross validation technique was used to select the best model. To choose hyper-parameters (the number of hidden neurons per layer), the lowest MSE configuration averaged over five folds was used. For each fold, 80% of the dataset was used for training validation and 20% was used for testing. The average test MSE of a five-fold run was representative of the entire dataset.

Data preprocessing was found to have the most impact in minimizing the MSE. A moving average filter at the output would smooth variations due to transitory signals, but as a post-processing step this is ignored in the results.

Experimental Setup and Dataset

Figure 2:
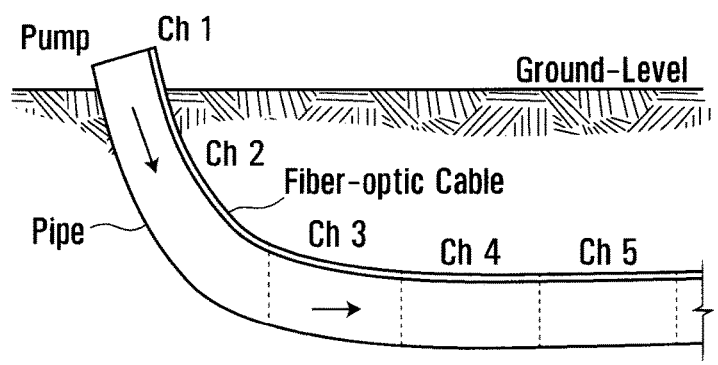
FIG. 2 is a schematic representation of a fiber-optic cable positioned relative to a pipeline, according to an embodiment of the disclosure.

FIG. 2 shows an experimental setup for estimating flowrate in a pipeline, in accordance with an embodiment of the invention. Experimental field tests on the fiber-optic acoustic data shows promising results in being able to estimate the flowrate, even if the flow is changing with time. The addition of spatial data is shown to improve the accuracy of the flowrate estimation. The acoustic data provided contains pump and external "disturbance" noise (vehicles in the vicinity of the sensors), as well as fluid flow. The pipeline dataset was obtained from a field test with a 41 kHz fiber-optic sensor. The experimental data consists of a six-day period with flowrate (dimensions not given) sampled every minute. The pipe was subjected to a variety of flow, temperature, strain changes and external noise. Nine channels of data are obtained with timestamps for each measurement, each representing a spatial length of 25 m along the pipeline. The measured flowrate was assumed to be equal in the 200 m of the pipe segment.

Fiber-Optic Cable

Figure 3:
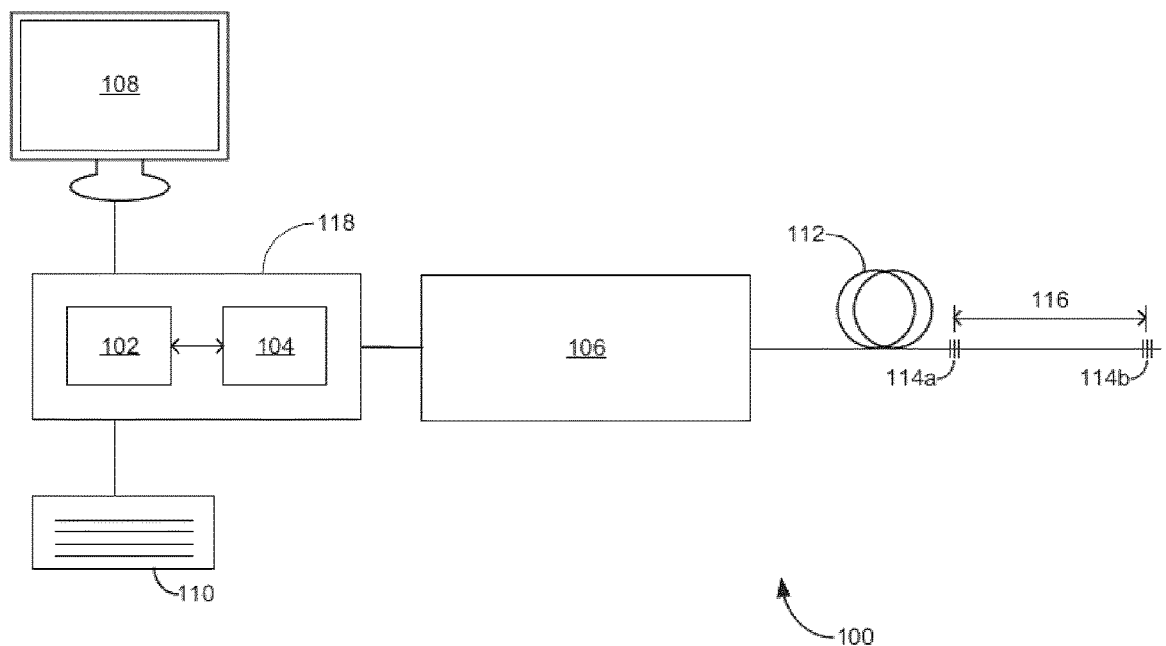
FIG. 3 is a block diagram of a system for estimating flowrate in a pipeline, which includes an optical fiber with fiber Bragg gratings ("FBGs") for reflecting a light pulse, according to an embodiment of the disclosure.

There is now described one embodiment of a fiber-optic cable that may be used as part of a system for estimating flowrate in a pipeline. Referring now to FIG. 3, there is shown one embodiment of a system 100 for fiber optic sensing using optical fiber interferometry. The system 100 comprises an optical fiber 112, an interrogator 106 optically coupled to the optical fiber 112, and a signal processing device (controller) 118 that is communicative with the interrogator 106. While not shown in FIG. 3, within the interrogator 106 are an optical source, optical receiver, and an optical circulator. The optical circulator directs light pulses from the optical source to the optical fiber 112 and directs light pulses received by the interrogator 106 from the optical fiber 112 to the optical receiver.

The optical fiber 112 comprises one or more fiber optic strands, each of which is made from quartz glass (amorphous SiO2). The fiber optic strands are doped with a rare earth compound (such as germanium, praseodymium, or erbium oxides) to alter their refractive indices, although in different embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and Infini-Cor® series multimode fibers.

The interrogator 106 generates sensing and reference pulses and outputs the reference pulse after the sensing pulse. The pulses are transmitted along optical fiber 112 that comprises a first pair of fiver Bragg gratings (FBGs). The first pair of FBGs comprises first and second FBGs 114a,b (generally, "FBGs 114"). The first and second FBGs 114a,b are separated by a certain segment 116 of the optical fiber 112 ("fiber segment 116"). The length of the fiber segment 116 varies in response to an acoustic vibration that the optical fiber 112 experiences. Each fiber segment 116 between any pair of adjacent FBGs 114 with substantially identical center wavelengths is referred to as a "channel" of the system 200.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 3 shows only the one pair of FBGs 114a,b, in different embodiments (not depicted) any number of FBGs 114 may be on the fiber 112, and time division multiplexing ("TDM") (and optionally, wavelength division multiplexing ("WDM")) may be used to simultaneously obtain measurements from them. If two or more pairs of FBGs 114 are used, any one of the pairs may be tuned to reflect a different center wavelength than any other of the pairs. Alternatively a group of multiple FBGs 114 may be tuned to reflect a different center wavelength to another group of multiple FBGs 114 and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the optical source 101. When different pairs of the FBGs 114 are not tuned to different center wavelengths, TDM is sufficient.

The interrogator 106 emits laser light with a wavelength selected to be identical or sufficiently near the center wavelength of the FBGs 114 that each of the FBGs 114 partially reflects the light back towards the interrogator 106. The timing of the successively transmitted light pulses is such that the light pulses reflected by the first and second FBGs 114a,b interfere with each other at the interrogator 106, and the optical receiver 103 records the resulting interference signal. The acoustic vibration that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the acoustic vibration the fiber segment 116 is experiencing, which allows the interrogator 106 to estimate the magnitude of the acoustic vibration the fiber segment 116 experiences from the received optical power. The interrogator 106 digitizes the phase difference and outputs an electrical signal ("output signal") whose magnitude and frequency vary directly with the magnitude and frequency of the acoustic vibration the fiber segment 116 experiences.

The signal processing device (controller) 118 is communicatively coupled to the interrogator 106 to receive the output signal. The signal processing device 118 includes a processor 102 and a non-transitory computer readable medium 104 that are communicatively coupled to each other. An input device 110 and a display 108 interact with the processor 102. The computer readable medium 104 has encoded on it statements and instructions to cause the processor 102 to perform any suitable signal processing methods to the output signal. Example methods include those described in PCT application PCT/CA2012/000018 (publication number WO 2013/102252), the entirety of which is hereby incorporated by reference.

Figure 4:
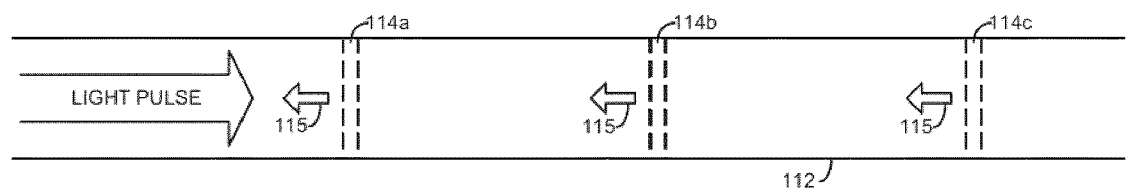
FIG. 4 is a schematic that depicts how the FBGs reflect a light pulse.

FIG. 4 depicts how the FBGs 114 reflect the light pulse, according to another embodiment in which the optical fiber 112 comprises a third FBG 114c. In FIG. 4, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect an acoustic vibration along the fiber 112 occurring further from the optical source 101 than the second FBG 114b. For example, in the embodiment of FIG. 4, a portion of the sensing pulse not reflected by the first and second FBGs 114a,b can reflect off the third FBG 114c and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference ($\theta$) is as follows: $\theta = 2\pi nL/\lambda$, where n is the index of refraction of the optical fiber; L is the optical path length of the fiber segment 116; and $\lambda$ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, emitting energy or a thermal event.

Figure 5:
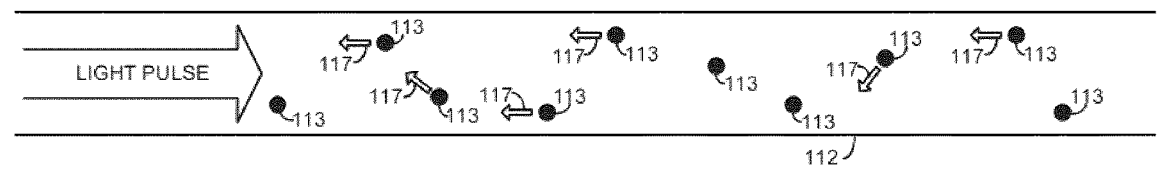
FIG. 5 is a schematic that depicts how a light pulse interacts with impurities in an optical fiber that results in scattered laser light due to Rayleigh scattering, which is used for distributed acoustic sensing ("DAS")

One conventional way of determining $\Delta nL$ is by using what is broadly referred to as distributed acoustic sensing ("DAS"). DAS involves laying the fiber 112 through or near a region of interest (e.g. a pipeline) and then sending a coherent laser pulse along the fiber 112. As shown in FIG. 5, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 4 and 5, Rayleigh scattering transmits less light back towards the optical receiver 103 than using the FBGs 114.

DAS accordingly uses Rayleigh scattering to estimate the magnitude, with respect to time, of the acoustic vibration experienced by the fiber during an interrogation time window, which is a proxy for the magnitude of the acoustic vibration. In contrast, the embodiments described herein measure acoustic vibrations experienced by the fiber 112 using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of 2% or 5%. The use of FBG-based interferometry to measure interference causing events offers several advantages over DAS, in terms of optical performance.

Data Preprocessing—Feature Extraction and Input Selection

Figure 6:
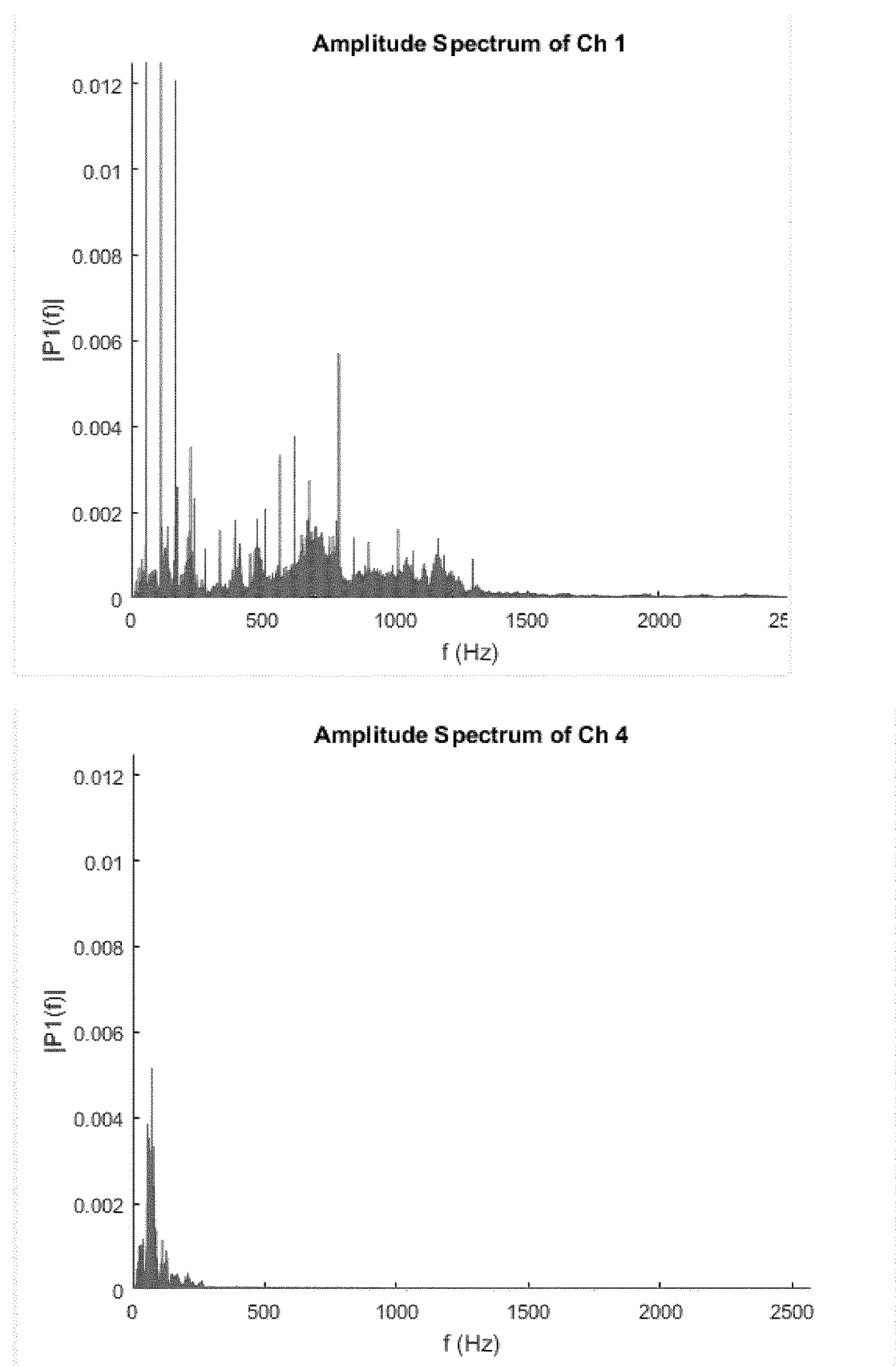
FIG. 6 is a sample FFT spectrum of Channel 1 and Channel 4; the first 2500 Hz are shown.

Returning to the embodiment of FIG. 2, to align with the flowrate, the raw acoustic data from the nine channels with non-overlapping one minute windows was transformed into the frequency domain using the Fast Fourier Transform (FFT). This allows the temporal information to be captured while extracting specific components. A high pass filter prior to the FFT removed DC component frequencies. A sample spectrum is shown in FIG. 6. As channel 4 lies along a flat region of the pipe underground, it is more representative of the flow acoustics than the first two channels. Therefore, channel 4 was used for single channel tests.

Data Preprocessing—Grouping of Features

Standardizing the inputs to zero mean and unit variance was found to produce best results, as small spikes in higher frequencies are captured. To avoid having too large an input dimension per channel, neighboring frequencies were grouped together in bands of 20 Hz, up to 2 kHz (thereby defining 100 bands). From 2 KHz to 20.6 kHz, 100 Hz bands are used (186 bands), as preliminary experiments showed stronger correlation on lower frequencies. The maximum number of inputs was 286 per channel, for a total of 2574 inputs.

Experiments and Results

Experiments were conducted using MATLAB 2015b (The MathWorks Inc., "MATLAB and Neural Network Toolbox Release 2015b." Natick, Massachusetts, United States) libraries for preprocessing, visualization, and deep learning. The autoencoder deep network (AE-DNN) was compared to a linear regression analysis for single channel inputs. Due to a high correlation between multiple channels, linear regression could only be performed using one channel. A single-hidden layer MLP, with the number of hidden neurons chosen via cross validation, was also compared to the AE-DNN. The coefficient of determination (R2 value) is provided, which measures model fitness with observed data: a value of 1 describes a model that perfectly fits the observed data. If time is an issue, a single layer MLP would suffice for fast training, but a deep network generally gives a better flow estimation.

The experimental results are reported as normalized root mean squared error (NRMSE; equation (5) averaged over 10 independent runs of five-fold cross validation (Table 1).

TABLE 2

Comparison Summary of Model Performances*
(10 independent runs and 5 folds

| AE-DNN Configuration | Configuration Details | Linear Regression Test set NRMSE | MLP Test set NRMSE | (AE-DNN) Test set NRMSE | (AE-DNN) $R^2$ value |
|---|---|---|---|---|---|
| Network 1 (AE100-MLP150-150) | All channels, RMS value (9 inputs) | 0.112603 | 0.069657 | 0.067324 | 0.76 |
| Network 2 (AE100-MLP-80-80) | (Ch 4) frequency (286 inputs) | 0.077857 | 0.065212 | 0.063612 | 0.78 |
| Network 3 (AE100-MLP100-100) | (Ch 4) frequency up to 2 kHz (100 inputs) | 0.08529 | 0.059329 | 0.059967 | 0.80 |
| Network 4 (AE100-MLP200-200) | All Channel frequency (2574 inputs) | — | 0.065432 | 0.062649 | 0.77 |
| Network 5 (AE100-MLP80-80) | All Channel Frequency up to 1 kHz (450 inputs) | — | 0.059256 | 0.052938 | 0.83 |
| Network 6 (AE100-MLP200-200) | All-Channel Frequency up to 1 kHz, Harmonics removed | — | 0.060695 | 0.05858 | 0.81 |

*bolded NRMSE values show improvement in using AE-DNN.
Note:
NRMSE of training set would be lower than the test set.

$$NRMSE = \frac{\sqrt{MSE}}{\bar{y}} \qquad (5)$$

Figure 7:
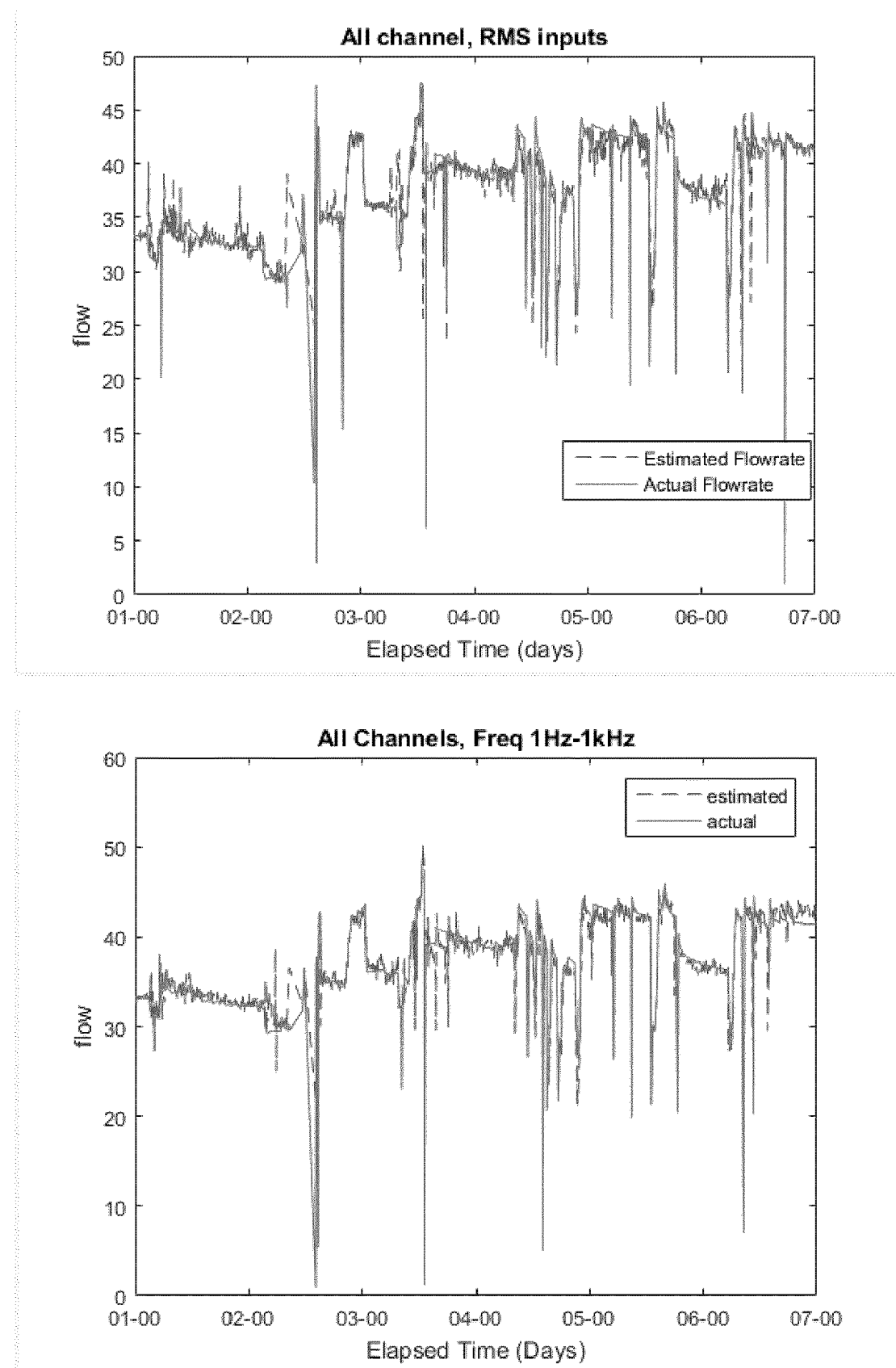
FIG. 7 shows graphs of flowrate and estimated flowrate for (on the left) all channels, RMS inputs, and (on the right) channel 4, frequency inputs; aside from relatively fast transition regions, the flowrate estimate tracks the measured flowrate.
Figure 8:
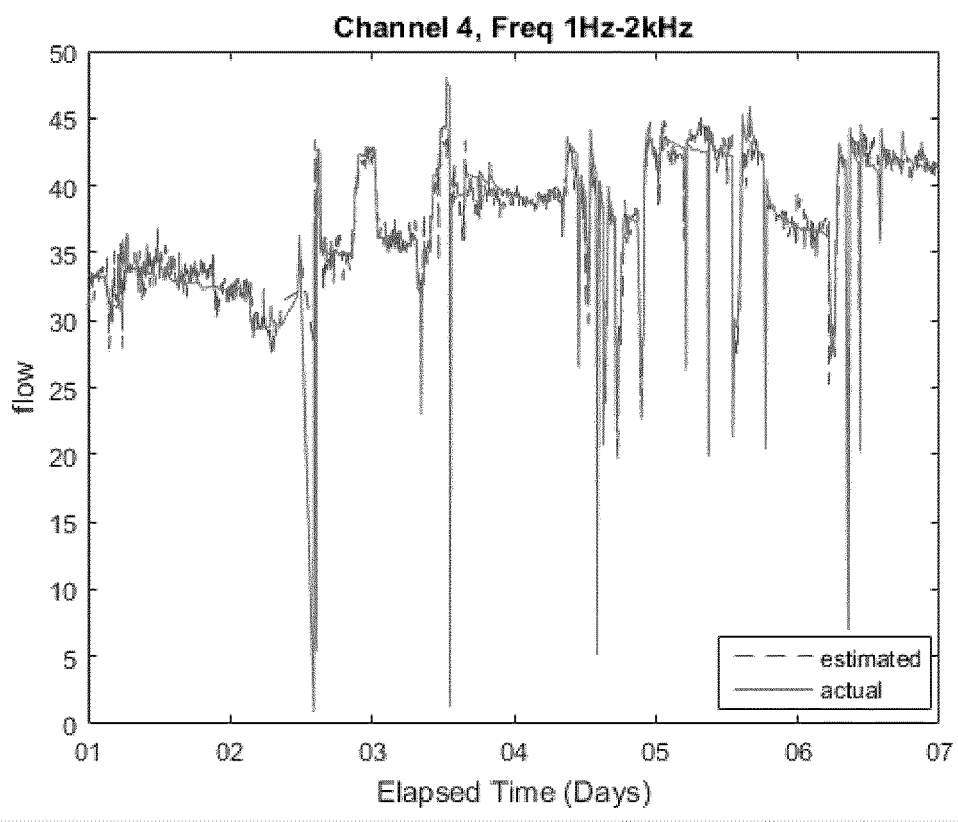
FIG. 8 shows graphs of flowrate and estimated flowrate for (on the left) all channels, frequency inputs, bands 1-50 only, and (on the right) a linear regression fit of the data.
Figure 8:
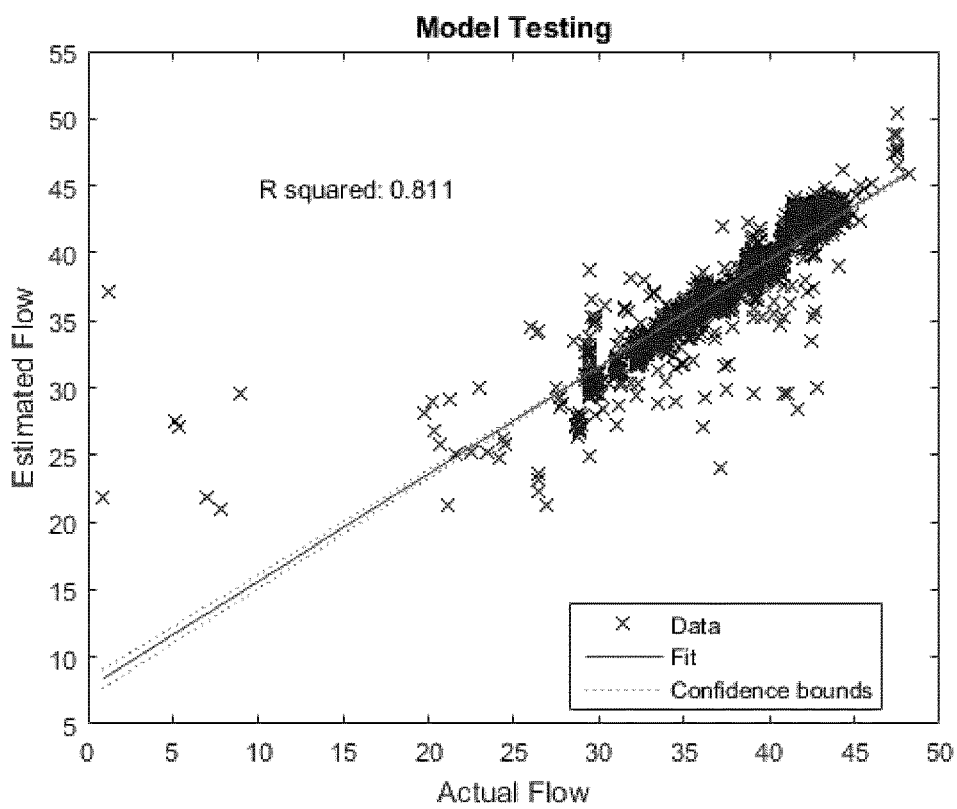

A network that showed good performance was a single autoencoder with 100 hidden neurons connected with a 2 hidden-layer MLP with 100 hidden neurons (AE100-MLP100-100). Output flowrates from a single cross validation fold are plotted in FIGS. 7 and 8.

Root Mean Square (RMS) Inputs with Multiple Channels

In some embodiments, it is possible to sum all frequencies and use the root mean square value. However, this method may be insufficient to represent the flow using a single channel, since the network may not discriminate between disturbance events and flow changes. Using multiple channels improves performance as the network learns multi-dimensional features that correlate with the flow.

Frequency Inputs with Single and Multiple Channels

In another embodiment, the data may be split into several frequencies and used as inputs (Table 2). In one particular experiment, the first 1 kHz bands were found to be representative of the flow, especially if all channels were used. Since the data contained 20 KHz of frequency, it was experimented with keeping the higher frequency signals in case that some flow properties are distinguishable. Although autoencoder pre-training would also capture these correlations, manually removing inputs was found most effective in reducing the error.

TABLE 2

| Input data to Neural Network | |
| --- | --- |
| Number of Samples | 8078 |
| Flowrate mean ( ) | 37.4 |
| Flowrate variance ( ) | 25.2 |
| Training Samples (per fold) | 4845 |
| Validation Samples | 1615 |
| Testing Samples (holdout) | 1615 |
| Number of channels per sample | 9 |
| Frequency Bands per channel | 286 |
| Window time of FFT | 60 seconds |

Frequency Inputs with Pump Harmonics Removed

It is possible to further enhance the flow estimation by removing the pump and machinery dependency, by removing power in the harmonic bands containing frequencies related to the operation of machinery near the pipeline. In our experiments, RMSE did not change drastically, showing that the algorithm was not tracking the pump acoustics. This was also indirectly proven by using frequency data from channel 4 only (FIG. 3), which is far enough from the pump that harmonics are minimal.

Discussion of Results

The proposed method shows promising results in terms of establishing a qualitative relationship between acoustics and flowrate. The NRMSE, coefficient of determination (Table 1) and plots (FIGS. 7 and 8) show the viability of the learned model on the data. Several observations are discussed as follows:

1. Preprocessing of the data (choosing the inputs) has an impact on performance. The deep learning model using autoencoders shows better performance when given more inputs. The autoencoder creates a compressed representation of the inputs with pre-training in most cases.
2. The addition of adjacent channels gives spatial information and the network is able to correlate with flow. Differences in amplitude of inputs between channels may be used in a manner similar to transit-time acoustic flow meters.
3. A spectral representation contains information about the flowrate. One channel is enough to determine the flow. Multiple channels add another level of information and increase model accuracy, especially in a deep network.
4. Each sample typically uses a 60-second window, meaning short-term temporal information is kept. The neural network learns to distinguish features that correlate to changing flow. As shown when the pump harmonics are removed, the network is indirectly modelling fluid acoustic responses.
5. Typically, the first 2 kHz contain the most information regarding the flow. For the dataset, a signal frequency appearing above 2 kHz occurs fairly often, but may not be necessary as inputs.
6. Adjusting the neighborhood width of frequency bands would allow for more features to be selected or pruned, based on system conditions.

There has been shown an experimental method for tracking the flow in a pipe using acoustic data. Using deep learning methods on the dataset, a pipe model was generated by learning abstract flow characteristics embedded in the frequency domain. Spatial information may be learned by adding multiple channels. By using deep learning with a neural network model, in some embodiments the flow can be tracked using spectral features or multiple channels. The results show promise in being able to correlate the flow data with its acoustic behaviour, particularly in situations where the pipe and fluid parameters are unknown. Combined with fiber-optic acoustic sensing, this approach could be used to measure flow along the pipeline at a high spatial resolution.

One or more example embodiments have been described by way of illustration only. This description has been presented for purposes of illustration and description, but is not intended to be exhaustive or limited to the form disclosed. Many modifications and variations will be apparent to those of ordinary skill in the art without departing from the scope of the claims. It will be apparent to persons skilled in the art that a number of variations and modifications can be made without departing from the scope of the claims. In construing the claims, it is to be understood that the use of a computer to implement the embodiments described herein is essential at least where the presence or use of computer equipment is positively recited in the claims.

The invention claimed is:

1. A method of estimating flowrate of a fluid in a pipeline, comprising:
    obtaining acoustic data and flowrate data from a pipeline, wherein the acoustic data is indicative of acoustics of the fluid at a first position in the pipeline, and wherein the flowrate data is indicative of the flowrate of the fluid at the first position in the pipeline;
    inputting only the acoustic data and the flowrate data to a machine learning model;
    generating, using the machine learning model, a correlation between the acoustic data and the flowrate data;
    obtaining further acoustic data from the pipeline, wherein the further acoustic data from the pipeline is indicative of acoustics of the fluid at a second position in the pipeline, wherein the first position and the second position are different positions; and
    estimating, based on the correlation and based on the further acoustic data, the flowrate of the fluid at the second position in the pipeline,
    wherein:
    the machine learning model comprises an autoencoder; and
    generating the correlation between the acoustic data and the flowrate data comprises:
        extracting, using the autoencoder, one or more spectral features from the acoustic data and one or more spectral features from the flowrate data; and
        generating, using the autoencoder, the correlation based on the one or more spectral features extracted from the acoustic data and the one or more spectral features extracted from the flowrate data.

2. The method of claim 1, wherein the acoustic data is processed such that at least some of the acoustic data is transformed from a time domain into a frequency domain.

3. The method of claim 1, wherein the acoustic data comprises acoustic data as a function of a position along the pipeline.

4. The method of claim 1, wherein the machine learning model comprises an artificial neural network.

5. The method of claim 1, further comprising identifying a leak in the pipeline by comparing the flowrate of the fluid at the first position in the pipeline to the estimation of the flowrate of the fluid at the second position in the pipeline.

6. A non-transitory computer-readable medium having instructions stored thereon, the instructions configured when read by a computer to cause the computer to perform a method comprising:
   obtaining acoustic data and flowrate data from a pipeline, wherein the acoustic data is indicative of acoustics of a fluid at a first position in the pipeline, and wherein the flowrate data is indicative of a flowrate of the fluid at the first position in the pipeline;
   inputting only the acoustic data and the flowrate data to a machine learning model;
   generating, using the machine learning model, a correlation between the acoustic data and the flowrate data;
   obtaining further acoustic data from the pipeline, wherein the further acoustic data from the pipeline is indicative of acoustics of the fluid at a second position in the pipeline, wherein the first position and the second position are different positions; and
   estimating, based on the correlation and based on the further acoustic data, the flowrate of the fluid at the second position in the pipeline,
   wherein:
   the machine learning model comprises an autoencoder; and
   generating the correlation between the acoustic data and the flowrate data comprises:
      extracting, using the autoencoder, one or more spectral features from the acoustic data and one or more spectral features from the flowrate data; and
      generating, using the autoencoder, the correlation based on the one or more spectral features extracted from the acoustic data and the one or more spectral features extracted from the flowrate data.

7. The non-transitory computer-readable medium of claim 6, wherein the method further comprises processing the acoustic data such that at least some of the acoustic data is transformed from a time domain into a frequency domain.

8. The non-transitory computer-readable medium of claim 6, wherein the acoustic data comprises acoustic data as a function of a position along the pipeline.

9. The non-transitory computer-readable medium of claim 6, wherein the machine learning model comprises an artificial neural network.

10. The non-transitory computer-readable medium of claim 6, wherein the method further comprises identifying a leak in the pipeline by comparing the flowrate of the fluid at the first position in the pipeline to the estimation of the flowrate of the fluid at the second position in the pipeline.

11. A system for estimating flowrate of a fluid in a pipeline, comprising:
   an optical fiber positioned in acoustic proximity to the pipeline and configured to detect acoustics from the pipeline;
   an optical interrogator optically coupled to the optical fiber and configured to convert the detected acoustics into acoustic data, wherein the acoustic data is indicative of acoustics of the fluid at a first position in the pipeline; and
   one or more processors communicative with the optical interrogator and configured to:
      input only the acoustic data and flowrate data to a machine learning model, wherein the flowrate data is indicative of the flowrate of the fluid at the first position in the pipeline;
      generate, using the machine learning model, a correlation between the acoustic data and the flowrate data; and
      estimate, based on the correlation and based on further acoustic data indicative of acoustics of the fluid at a second position in the pipeline, the flowrate of the fluid at the second position in the pipeline, wherein the first position and the second position are different positions,
   wherein:
   the machine learning model comprises an autoencoder; and
   the one or more processors are further configured to:
      extract, using the autoencoder, one or more spectral features from the acoustic data and one or more spectral features from the flowrate data; and
      generate, using the autoencoder, the correlation based on the one or more spectral features extracted from the acoustic data and the one or more spectral features extracted from the flowrate data.

12. The system of claim 11, wherein the optical fiber comprises a pair of fiber Bragg gratings tuned to substantially identical center wavelengths.

13. The system of claim 11, wherein the one or more processors are further configured to process the acoustic data such that at least some of the acoustic data is transformed from a time domain into a frequency domain.

14. The system of claim 11, wherein the acoustic data comprises acoustic data as a function of a position along the pipeline.

15. The system of claim 11, wherein the machine learning model comprises an artificial neural network.

16. The system of claim 11, wherein the one or more processors are further configured to identify a leak in the pipeline by comparing the flowrate of the fluid at the first position in the pipeline to the estimation of the flowrate of the fluid at the second position in the pipeline.

* * * * *